United States Patent
Nishida et al.

(10) Patent No.: US 8,107,180 B2
(45) Date of Patent: Jan. 31, 2012

(54) HARD-DISK DRIVE AND CONTROL METHOD FOR MAGNETIC RECORDING ON A PATTERNED MEDIUM OF THE HARD-DISK DRIVE

(75) Inventors: Shuji Nishida, Kanagawa (JP); Yasutaka Nishida, Kanagawa-ken (JP); Masafumi Mochizuki, Kanagawa-ken (JP); Hideaki Maeda, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 0 days.

(21) Appl. No.: 12/505,085

(22) Filed: Jul. 17, 2009

(65) Prior Publication Data

US 2011/0058274 A1    Mar. 10, 2011

(30) Foreign Application Priority Data

Jul. 18, 2008    (JP) .................................. 2008-186714

(51) Int. Cl.
*G11B 5/09* (2006.01)
*G11B 27/36* (2006.01)
(52) U.S. Cl. .......................................... 360/51; 360/31
(58) Field of Classification Search .................. None
See application file for complete search history.

(56) References Cited

U.S. PATENT DOCUMENTS

2008/0304173 A1 * 12/2008 Albrecht et al. ................ 360/51

FOREIGN PATENT DOCUMENTS

| JP | 2002109712 | 4/2002 |
|----|------------|--------|
| JP | 2003157631 | 5/2003 |

* cited by examiner

*Primary Examiner* — Daniell L Negron
*Assistant Examiner* — Regina N Holder

(57) ABSTRACT

A hard-disk drive. The hard-disk drive includes a magnetic-recording disk including tracks on which a plurality of patterned bit-cells that are isolated magnetically are aligned at predetermined alignment pitches. The hard-disk drive includes a magnetic-recording head which is configured to follow tracks, and to write and to read data. The hard-disk drive includes a signal-processing unit which is configured to generate a recording signal based on a write-clock signal with cycles corresponding to alignment pitches of patterned bit-cells, and to output a recording signal. The hard-disk drive includes a phase-detecting unit which is configured to detect a phase of the write-clock signal when the magnetic-recording head reaches an end point of a predetermined range. The hard disk drive includes a determination-processing unit which is configured to determine success of data writing based on a difference between an expected value and a detected value of the phase of the write-clock signal.

9 Claims, 8 Drawing Sheets

HARD-DISK DRIVE AND CONTROL METHOD FOR MAGNETIC RECORDING ON A PATTERNED MEDIUM OF THE HARD-DISK DRIVE

CROSS-REFERENCE TO RELATED APPLICATION

This application claims priority from the Japanese Patent Application No. 2008-186714, filed Jul. 18, 2008, the disclosure of which is incorporated herein in its entirety by reference.

TECHNICAL FIELD

Embodiments of the present invention relate to a hard-disk drive (HDD) and a control method for magnetic recording on a patterned medium of the HDD.

BACKGROUND

Patterned media, which have tracks in which a plurality of magnetic bit-cells that are isolated magnetically from each other are aligned in a periodically repeating array, have recently received attention as potential magnetic-recording media for hard-disk drives (HDDs). The patterned media are advantageous in that adjacent track interference (ATI) and transition noise due to the transitions between recorded bits can be reduced, and thermal decay of recorded magnetization in recorded bits can be suppressed. When data is written onto the patterned medium, a magnetic-recording field is applied that is timed to correspond with the alignment pitches of the magnetic hit-cells. The timing of the magnetic-recording field is adjusted based on data read from the tracks before data is written.

However, data can not be correctly read from the tracks during the writing of data due to the presence of the magnetic-recording field. Thus, when the alignment pitches of the magnetic bit-cells and the timing of the magnetic-recording field are shifted from each other due to variation of the rotation speed of a spindle motor and the frequency of a write-clock signal causes a failure in the writing of data, such a failure may not be recognized. One method for recognizing success, or failure, in the writing of data is to utilize a verification process for confirming whether, or not, data can be correctly read from a portion of a magnetic-recording disk where the data is written after the writing of data. If the verification process is performed every time the data is written, performance of the HOD may be impaired.

SUMMARY

Embodiments of the present invention include a hard-disk drive. The hard-disk drive includes a magnetic-recording disk including tracks on which a plurality of patterned bit-cells that are isolated magnetically from each other are aligned at predetermined alignment pitches. The hard-disk drive also includes a magnetic-recording head which is configured to follow tracks, and to write and to read data. In addition, the hard-disk drive includes a signal-processing unit which is configured to generate a recording signal based on a write-clock signal with cycles corresponding to the alignment pitches of the patterned bit-cells, and to output the recording signal to the magnetic-recording head. The hard-disk drive further includes a phase-detecting unit which is configured to detect a phase of the write-clock signal when the magnetic-recording head reaches an end point of a predetermined range including a range into which data are written by the magnetic-recording head in the tracks. Moreover, the hard disk drive includes a determination-processing unit which is configured to determine success of data writing based on a difference between an expected value and a detected value of the phase of the write-clock signal when the magnetic-recording head reaches the end point of the predetermined range.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
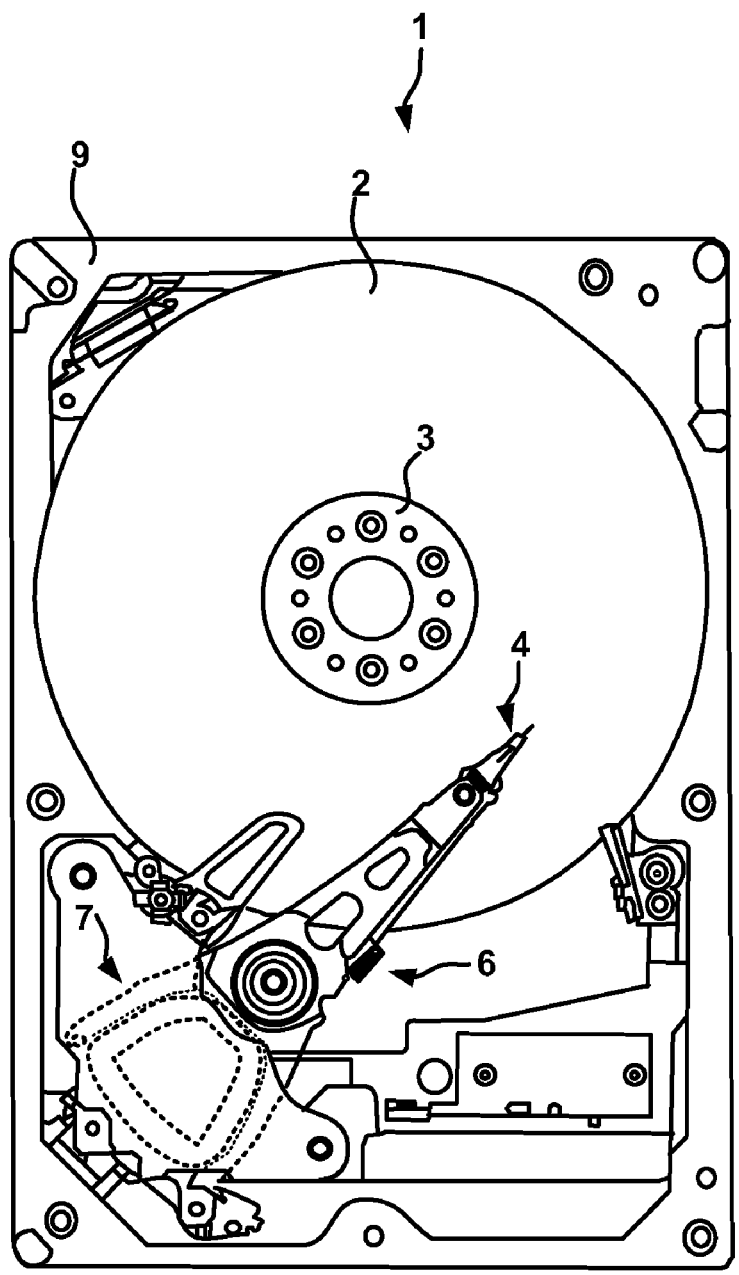
FIG. 1 is an example plan view of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Description of Embodiments of the Present Invention for a Hard-Disk Drive and Control Method for Magnetic Recording on a Patterned Medium of the Hard-Disk Drive Embodiments of the present invention provide a hard-disk drive (HDD) and a control method for magnetic recording on a patterned medium of the HDD capable of determining success, or failure, of data writing onto a patterned medium without deteriorating performance of the HDD. To enable such a determination, embodiments of the present invention enable confirmation of whether, or not, a magnetic-recording field has been applied with timing in synchronization with the alignment pitch of magnetic bit-cells when a magnetic-recording head reaches an end point of a predetermined range that includes a range into which data is written by the magnetic-recording head.

In accordance with embodiments of the present invention, a HDD includes: a magnetic-recording disk including tracks on which a plurality of patterned bit-cells that are isolated magnetically from each other are aligned at predetermined alignment pitches; a magnetic-recording head which is configured to follow tracks, and to write and to read data; a signal-processing unit which is configured to generate a recording signal based on a write-clock signal with cycles corresponding to the alignment pitches of the patterned bit-cells, and to output the recording signal to the magnetic-recording head; a phase-detecting unit which is configured to detect a phase of the write-clock signal when the magnetic-recording head reaches an end point of a predetermined range including a range into which data are written by the magnetic-recording head in the tracks; and a determination-processing unit which is configured to determine success, or failure, of data writing based on a difference between an expected value and a detected value of the phase of the write-clock signal when the magnetic-recording head reaches the end point of the predetermined range.

In another embodiment of the present invention, the control method for magnetic recording on a patterned medium of the HDD includes: a magnetic-recording disk including tracks on which a plurality of patterned bit-cells that are isolated magnetically from each other are aligned at predetermined alignment pitches; a magnetic-recording head which is configured to follow tracks, and to write and to read data; and a signal-processing unit which is configured to generate a recording signal based on a write-clock signal with cycles corresponding to the alignment pitches of the patterned bit-cells, and to output the recording signal to the magnetic-recording head. The control method for magnetic recording on a patterned medium of the HDD further includes: detecting a phase of the write-clock signal when the magnetic-recording head reaches an end point of a predetermined range including a range into which data are written by the magnetic-recording head in the tracks; and determining success, or failure, of data writing by the magnetic-recording head based on a difference between an expected value and a detected value of the phase of the write-clock signal when the magnetic-recording head reaches the end point of the predetermined range.

In one embodiment of the present invention, the phase-detecting unit is configured to detect the phase of the write-clock signal when the magnetic-recording head reaches each of a start point and the end point of the predetermined range, and the determination-processing unit is configured to obtain the expected value based on the detected value of the phase of the write-clock signal when the magnetic-recording head reaches the start point of the predetermined range.

In another embodiment of the present invention, the determination-processing unit may obtain the expected value based on the detected value of the phase of the write-clock signal when the magnetic-recording head reaches the start point of the predetermined range, a length of the predetermined range and the alignment pitches of the patterned bit-cells.

In another embodiment of the present invention, the HDD also includes a counter that is configured to count the value of the write-clock signal, or a clock signal corresponding thereto, during a period when the magnetic-recording head passes through the predetermined; and the determination-processing unit is also configured to determine success or failure of data writing based on the value of the counted write-clock signal, or the counted clock signal corresponding thereto.

In another embodiment of the present invention, the HDD also includes a time-detecting unit that is configured to detect a time interval during which the magnetic-recording head passes through the predetermined range; and the determination-processing unit is also configured to determine success, or failure, of data writing based on the detected time interval.

In one embodiment of the present invention, the determination-processing unit is also configured to send an instruction to write the data again upon determining that the data writing has failed.

In another embodiment of the present invention, the HDD includes: a magnetic-recording disk including tracks on which a plurality of patterned bit-cells that are isolated magnetically from each other are aligned at predetermined alignment pitches; a magnetic-recording head which is configured to follow tracks, and to write and to read data; a signal-processing unit which is configured to generate a recording signal based on a write-clock signal with cycles corresponding to the alignment pitches of the patterned bit-cells, and to output the recording signal to the magnetic-recording head; a time-detecting unit which is configured to detect a time interval during which the magnetic-recording head passes through a predetermined range including a range into which data are written by the magnetic-recording head in the tracks; and a determination-processing unit which is configured to determine success, or failure, of data writing by the magnetic-recording head based on a difference between an expected value and a detected value of the time interval during which the magnetic-recording head passes through the predetermined range.

In one embodiment of the present invention, the determination-processing unit is also configured to obtain the expected value based on a length of the predetermined range and a tracking speed of the magnetic-recording head with respect to the tracks.

With reference now to FIG. 1, in accordance with an embodiment of the present invention, a plan view of a HDD 1 is shown. FIG. 1 shows a view of HDD 1 with a top cover of the disk enclosure (DE) removed, so as not to unnecessarily obscure details of embodiments of the present invention. In a base 9 of the DE of the HDD 1, a magnetic-recording disk 2 and a head-arm assembly (HAA) 6 are accommodated. The magnetic-recording disk 2 is mounted to a spindle motor 3 provided at a bottom portion of the base 9 of the DE. The HAA 6 is rotatable on a pivot in proximity to the magnetic-recording disk 2. A magnetic-recording head 4 is supported at a distal end of the HAA 6. On the other hand, a voice coil motor 7 is provided at the end opposite to the distal end of the HAA 6. The voice coil motor 7 swings the HAA 6 on the pivot, thereby moving the magnetic-recording head 4 in a substantially radial direction over the magnetic-recording disk 2.

Figure 2:
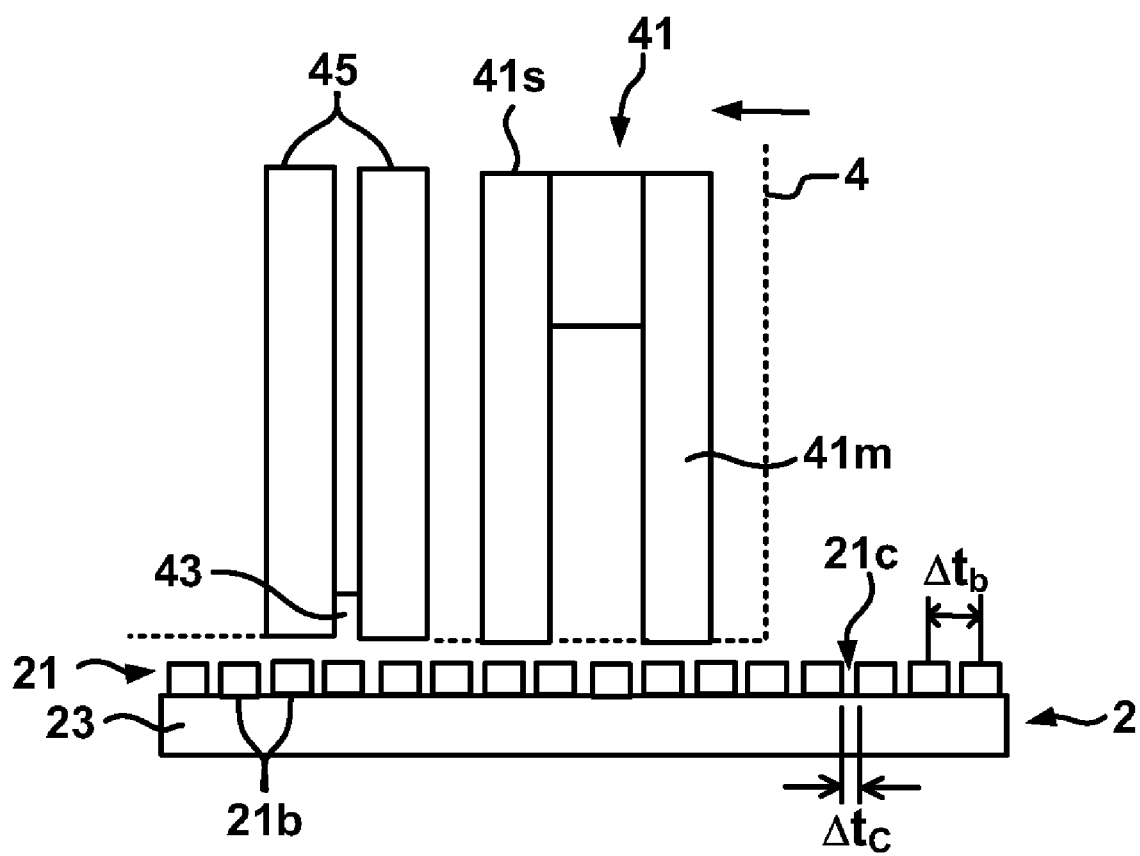
FIG. 2 is a is an explanatory view of a magnetic-recording head and a magnetic-recording disk, in accordance with an embodiment of the present invention.

With reference now to FIG. 2, in accordance with an embodiment of the present invention, the magnetic-recording disk 2 is configured as a so-called patterned medium including tracks 21 on which a plurality of magnetic bit-cells 21*b*, which are patterned bit-cells, that are isolated magnetically from each other are aligned at predetermined alignment pitches $\Delta t_b$. These magnetic bit-cells 21*b* are formed by patterning a magnetic layer formed on a nonmagnetic substrate 23. A groove 21*c* obtained by removing the magnetic layer is formed between adjacent magnetic bit-cells 21*b*, thereby magnetically isolating the magnetic bit-cells 21*b* from each other. In one embodiment of the present invention, the respective grooves 21*c* may be filled with nonmagnetic material. In another embodiment of the present invention, if each magnetic bit-cell 21*b* is a bi-layer medium configured by laminating a soft magnetic layer and a hard magnetic layer, a portion of the soft magnetic layer of one magnetic bit-cell, for example, magnetic bit-cell 21*b*, may not be magnetically isolated from a portion of the soft magnetic layer of an adjacent magnetic bit-cell.

With further reference to FIG. 2, in accordance with an embodiment of the present invention, the magnetic-recording head 4 includes a write element 41 and a read element 43 at a trailing edge of a slider (not shown) to which the magnetic-recording head 4 is attached. The write element 41 includes a main pole 41*m* and a return pole 41*s*, and produces a magnetic-recording field perpendicular to the magnetic-recording disk 2 from a pole tip of the main pole 41*m*. Further, the read element 43 is disposed between a pair of magnetic shields 45, for example, in a sandwich-like configuration. The slider including the magnetic-recording head 4 flies close to the rotating magnetic-recording disk 2 in proximity to tracks 21. The write element 41 of the magnetic-recording head 4 writes data by applying the magnetic-recording field to the magnetic bit-cells 21*b* of the tracks 21. If timing of the polarity reversal of the magnetic-recording field emanating from the main pole 41*m* is synchronized with the alignment of the magnetic bit-cells 21*b*, data is written successfully to the magnetic-recording disk t2; if timing of the polarity reversal of the magnetic-recording field emanating from the main pole 41*m* is not synchronized with the alignment of the magnetic bit-cells 21*b*, data may fail to be written successfully to the magnetic-recording disk t2.

Figure 3:
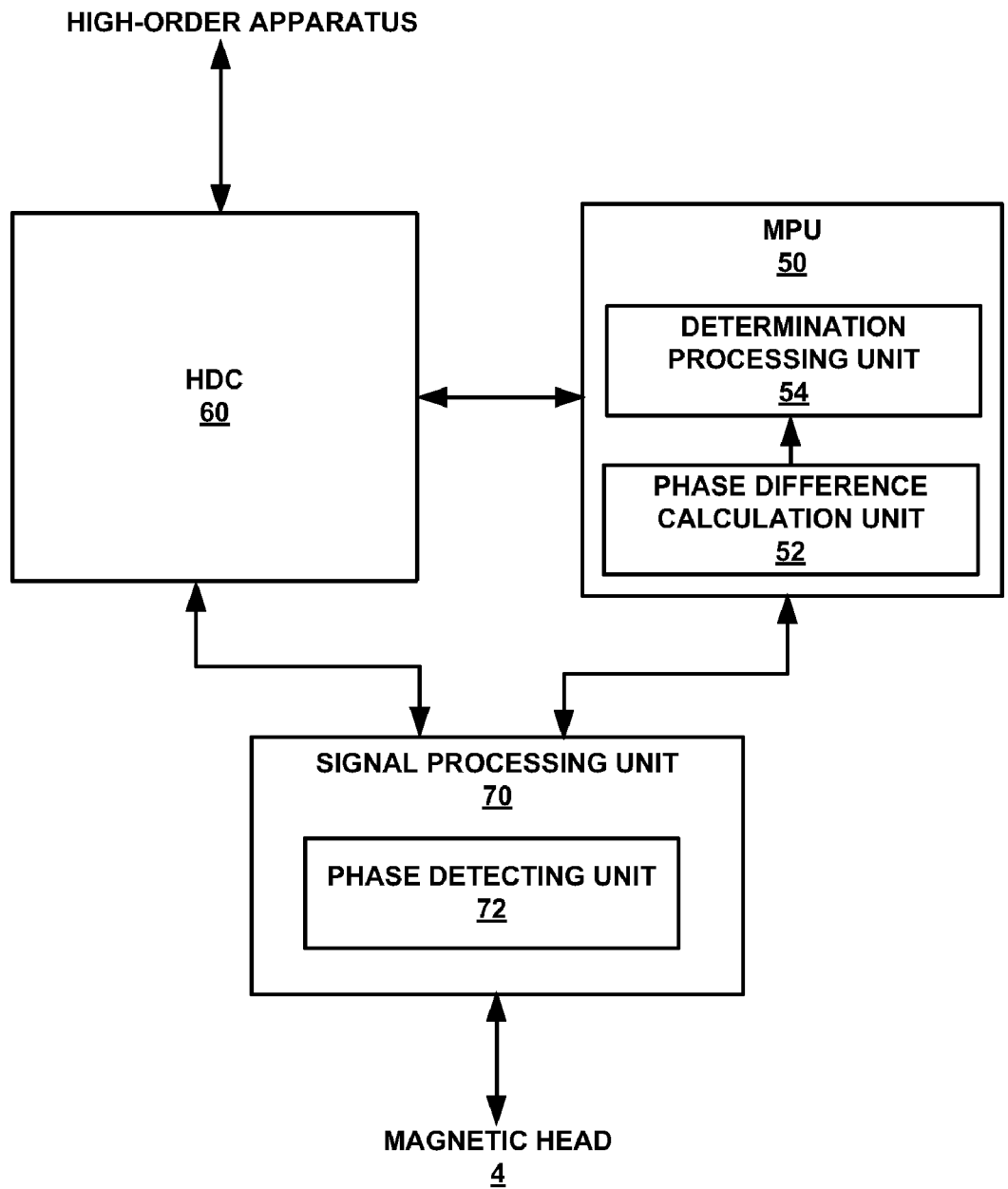
FIG. 3 is an example block diagram showing an example of a circuit configuration of the HDD, in accordance with an embodiment of the present invention.

With reference now to FIG. 3, in accordance with an embodiment of the present invention, a block diagram showing an example of a circuit configuration of the HDD 1 is shown. The HDD 1 includes a micro processing unit (MPU) 50, a hard disk controller (HDC) 60, and a signal-processing unit (channel circuit) 70. When receiving data to be recorded into the magnetic-recording disk 2 from a host system, the HDC 60 transmits the data to the signal-processing unit 70. The signal-processing unit 70 modulates the data to be converted into a magnetic-recording signal, and then outputs the same to the magnetic-recording head 4. The magnetic-recording head 4 converts the magnetic-recording signal into the magnetic-recording field by means of the write element 41 previously described to write data to the magnetic-recording disk 2. On the other hand, the magnetic-recording head 4 converts a fringing magnetic field from magnetic bit-cells 21*b* of the magnetic-recording disk 2 into a read-back signal by means of read element 43 previously described, and outputs the read-back signal to the signal-processing unit 70. The signal-processing unit 70 converts the read-back signal into data, and outputs the data to the HDC 60. The HDC 60 transmits the data to the host system. The signal-processing unit 70 extracts servo data from the read-back signal at a predetermined sampling cycle to be output to the MPU 50. The MPU 50 controls the voice coil motor 7 on the basis of servo data. The operations of the MPU 50 and the signal-processing unit 70 are subsequently described in detail with reference to FIGS. 4 and 5.

Figure 4:
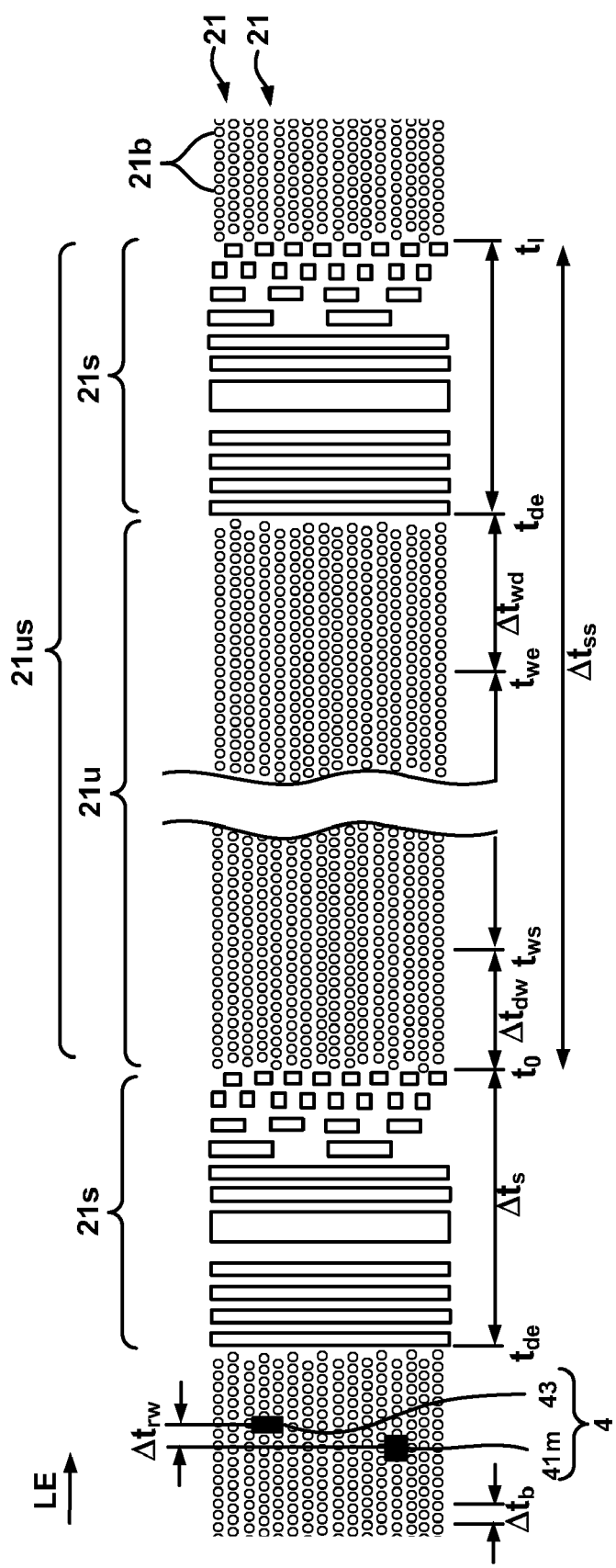
FIG. 4 is an example enlarged view of main portions of the magnetic-recording disk, in accordance with an embodiment of the present invention.

With reference now to FIG. 4, in accordance with an embodiment of the present invention, an enlarged view of main portions of the magnetic-recording disk 2 is shown. In FIG. 4, the tracks 21 include the rows of the magnetic bit-cells 21*b* in linear arrangement. In addition, the magnetic-recording head 4 moves in the direction shown by arrow LE in FIG. 4. Each track of the tracks 21 includes servo data areas 21*s* formed at a predetermined pitch and a user data area 21*u* formed between the servo data areas 21*s*. In each servo data area 21*s*, servo data are recorded that are used for positioning the magnetic-recording head 4 and determining the timing for the writing of data. As shown in FIG. 4, in one embodiment of the present invention, servo data may be provided by a so-called "pre-patterned servo pattern" in which the servo data is provided by a pattern in the magnetic layer through the presence, or absence, of material. However, this is by way of example and not limitation thereto as embodiments of the present invention are not limited to a pre-patterned servo pattern; for example, the servo data may also be magnetically recorded into servo data areas 21*s* that are not pre-patterned with a servo-data pattern.

Figure 5:
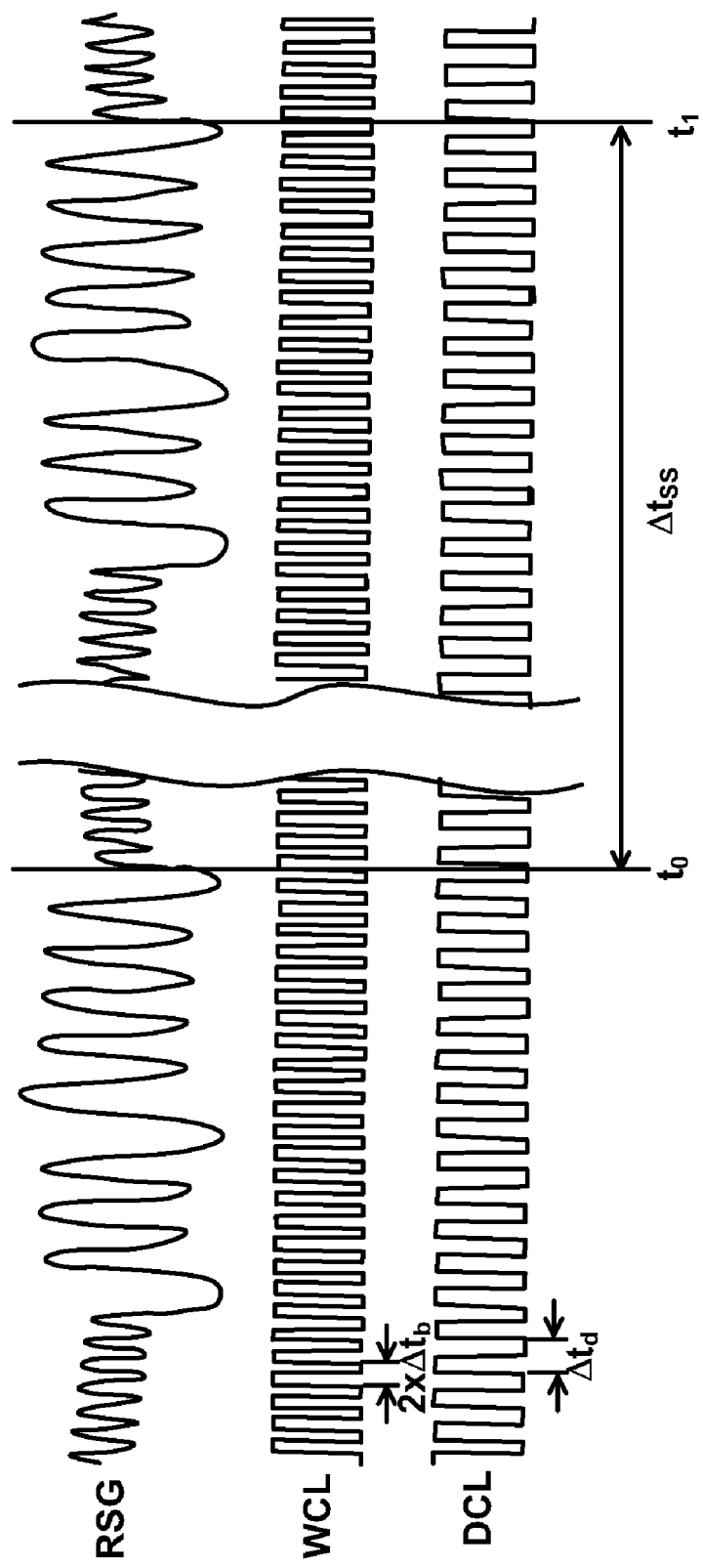
FIG. 5 is an explanatory view of a write-clock signal, in accordance with an embodiment of the present invention.

With reference now to FIG. 5, in accordance with an embodiment of the present invention, an explanatory view of a write-clock signal WCL is shown. FIG. 5 shows a relation between the write-clock signal WCL and a predetermined range of the tracks 21 shown in FIG. 4. In addition, FIG. 5 shows a read-back waveform RSG of the servo data area 21*s* used for synchronization with or generation of the write-clock signal WCL and a drive-clock signal DCL which is used as a base of the write-clock signal WCL. The drive-clock signal DCL is generated by a crystal oscillator, or similar circuit, included in HDD 1. The signal-processing unit 70 shown in FIG. 3 generates the write-clock signal WCL with cycles corresponding to the alignment pitches $\Delta t_b$ of magnetic bit-cells 21*b*, and generates the recording signal on the basis of the write-clock signal WCL. As shown in FIG. 5, the write-clock signal WCL is generated in such a manner that one period in the cycle of the write-clock signal WCL corresponds to twice the alignment pitch $\Delta t_b$ of the magnetic bit-cells 21*b*. More specifically, the write-clock signal WCL is generated in such a manner that the value obtained by multiplying the tracking speed, which is the rotation speed of the magnetic-recording disk 2, of the magnetic-recording head 4 with respect to a track of the tracks 21 by the cycle of the write-clock signal WCL corresponds to twice the alignment pitch $\Delta t_b$ of magnetic bit-cells 21*b*.

With further reference to FIG. 5, in accordance with an embodiment of the present invention, the value of the alignment pitch $\Delta t_b$ of the magnetic bit-cells 21*b* used for generating the write-clock signal WCL may be stored in a memory, or similar circuit, in advance, or alternatively, may be obtained from the read-back signal read by the magnetic-recording head 4 from a track of the tracks 21. In addition, the signal-processing unit 70 includes a phase synchronization circuit (PLL circuit), and allows the write-clock signal WCL to be synchronized every time the magnetic-recording head 4 passes through the servo data areas 21*s* to extract the servo data. Specifically, the signal-processing unit 70 adjusts the phase of the write-clock signal WCL so as to match the timing of the application of the magnetic-recording field with the timing of the approach of the magnetic bit-cell 21*b* before data are written into the user data area 21*u* by the magnetic-recording head 4. In another embodiment of the present invention, the signal-processing unit 70 includes a phase-detecting unit 72; the phase-detecting unit 72 detects the phase of each write-clock signal WCL before and after data are written by the magnetic-recording head 4, and outputs the phase of each write-clock signal WCL to the MPU 50. Specifically, the phase-detecting unit 72 detects the phase of the write-clock signal WCL when the magnetic-recording head 4 reaches each of a start point $t_0$ and an end point $t_1$ of a range 21 us, that includes a set of the user data area 21$u$ and the servo data area 21$s$. In other words, the phase-detecting unit 72 detects the phase of the write-clock signal WCL every time the magnetic-recording head 4 reaches the end point of the servo data area 21$s$.

Figure 6A:
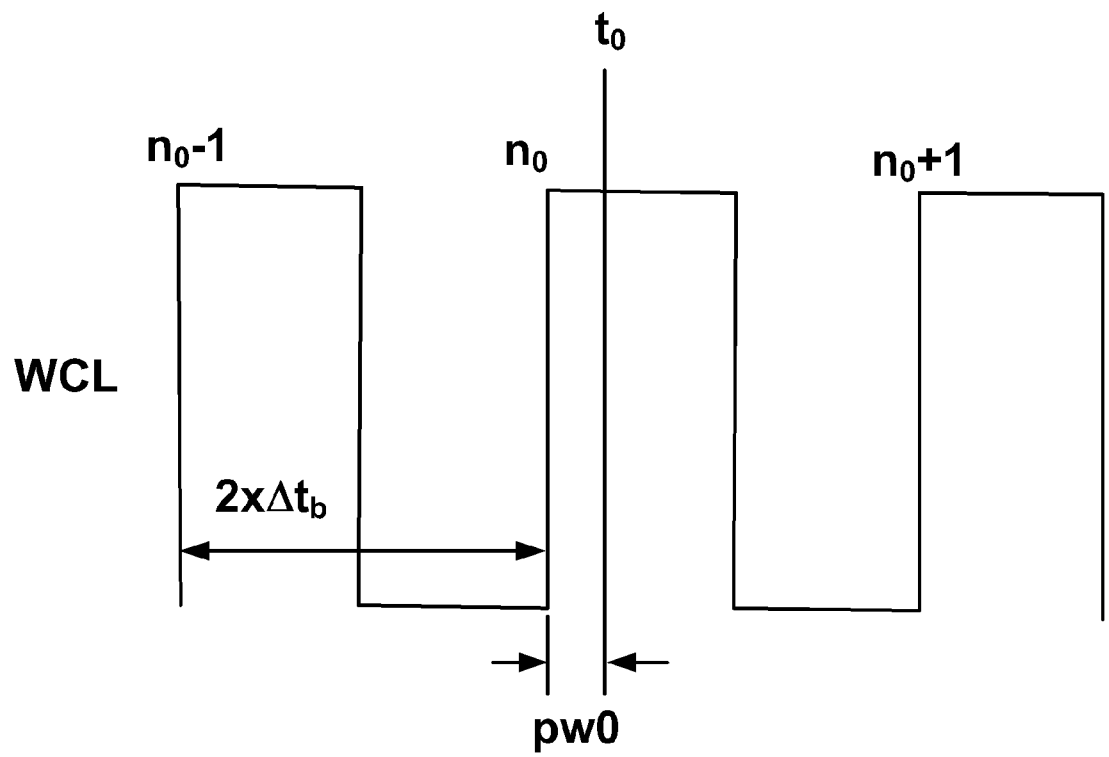
FIG. 6A is an example enlarged view of main portions of FIG. 5, in accordance with an embodiment of the present invention.
Figure 6B:
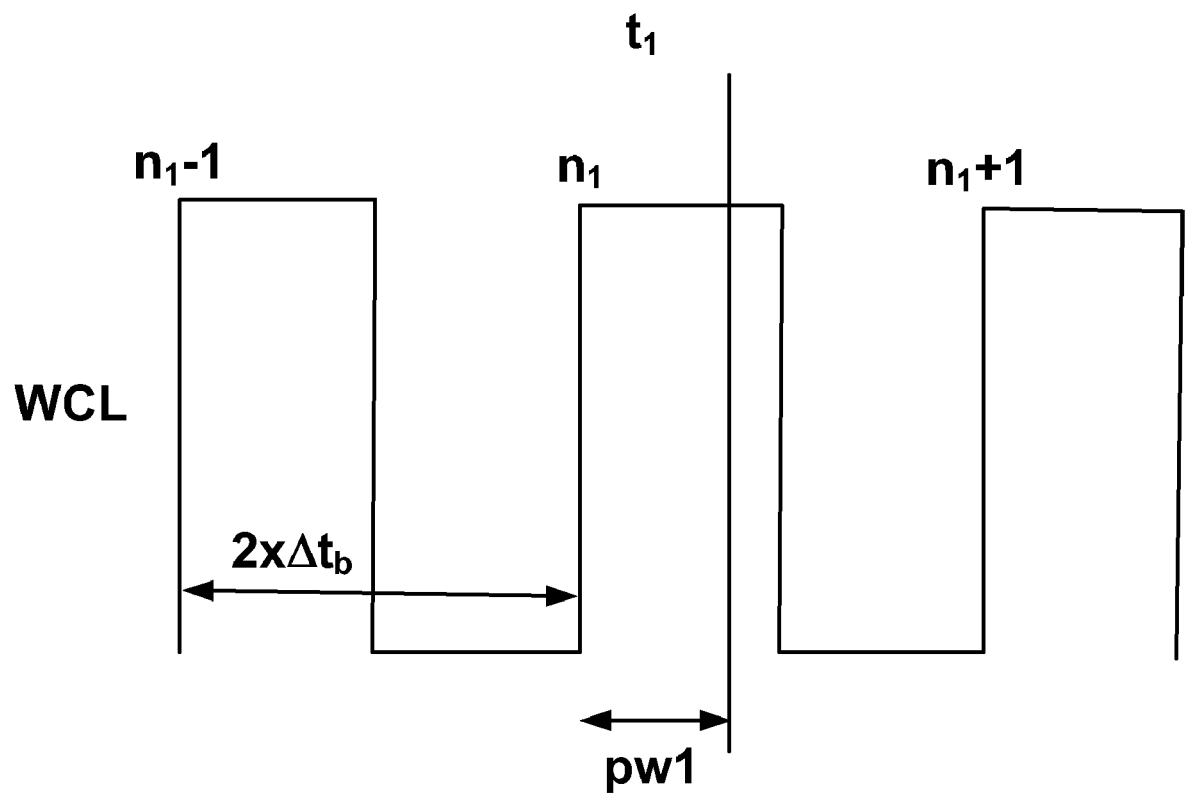
FIG. 6B is another example enlarged view of main portions of FIG. 5, in accordance with an embodiment of the present invention.

With reference now to FIGS. 6A and 6B, in accordance with an embodiment of the present invention, enlarged views of the main portions of FIG. 5 are shown. As shown in FIGS. 6A and 6B, it is assumed that the phase of the write-clock signal WCL at the start point $t_0$ is represented as pw0, and the phase of the write-clock signal WCL at the end point $t_1$ is represented as pw1. The phase pw1 of the write-clock signal WCL at the end point $t_1$ is detected before the write-clock signal WCL is synchronized. Therefore, the phase-detecting unit 72 detects the phase pw1 of the write-clock signal WCL at the end point $t_1$, and also detects the phase of the write-clock signal WCL after synchronization as a phase at the start point of the next range. The MPU 50 functionally includes a phase difference calculation unit 52 and a determination-processing unit 54. The phase difference calculation unit 52 calculates a phase difference between the write-clock signals WCLs before and after data is written by the magnetic-recording head 4, and outputs the same to the determination-processing unit 54. Specifically, when the phase pw0 of the write-clock signal WCL at the time the magnetic-recording head 4 reaches the start point $t_0$ of the range 21 us is input, the phase difference calculation unit 52 temporally maintains the same value in a storage unit such as a memory; and, when the phase pw1 of the write-clock signal WCL at the time the magnetic-recording head 4 reaches the end point $t_1$ of the range 21 us is input, the phase difference calculation unit 52 calculates a phase difference, which is a detected phase difference, pw1–pw0, between the phase, pw1, and the phase, pw0.

With further reference to FIGS. 6A and 6B, in accordance with an embodiment of the present invention, the determination-processing unit 54 determines success, or failure, of the data writing on the basis of the difference between an expected value pw1; and the detected value pw1 of the phase of the write-clock signal WCL at the time the magnetic-recording head 4 reaches the end point $t_1$ of the range 21 us. Specifically, the determination-processing unit 54 determines success, or failure, of the data writing by comparing the detected phase difference, pw1–pw0, input from the phase difference calculation unit 52 with an expected phase difference, pw1–pw0, obtained from a length of the range 21 us. The expected phase difference, pw1$_i$–pw0, is obtained on the basis of the length of the range 21 us and the alignment pitch $\Delta t_b$ of the magnetic bit-cells 21$b$. A detailed calculation method is subsequently described. In the case where the expected phase difference pw1$_i$–pw0 is a given value, the expected phase difference, pw0, may be compared with the detected phase difference, pw1–pw0, without performing the above calculation. In other words, in the case where the phase, pw0, of the write-clock signal WCL at the start point $t_0$ is a given value, the expected value, pw1 of the phase of the write-clock signal WCL at the end point $t_1$ is also a given value, so that a difference between the expected value, pw1$_i$, and the detected value pw1 may be obtained without obtaining the expected value, pw1$_i$. Furthermore, in the case where the difference between the expected value, pw1$_i$, and the detected value, pw1, of the phase of the write-clock signal WCL at the end point $t_1$ is within a predetermined acceptable range, the determination-processing unit 54 determines the data writing as success. In the case where the difference is out of the predetermined acceptable range, the determination-processing unit 54 determines the data writing as failure. In the case where the data writing is determined as failure, the MPU 50 instructs the HDC 60 to write the data again.

With further reference to FIGS. 6A and 6B, in accordance with an embodiment of the present invention, as described above, by determining success, or failure, of the data writing on the basis of the difference between the expected value pw1 and the detected value pw1 of the phase of the write-clock signal WCL at the time the magnetic-recording head 4 reaches the end point $t_1$ of the range 21 us, success, or failure, of the data writing may be rapidly determined without performing a verification process. Especially, since the phase of the write-clock signal WCL corresponding to the alignment pitch $\Delta t_b$ of the magnetic bit-cells 21$b$ is used, mismatching between the timing of the polarity reversal of the magnetic-recording field emanating from the main pole 41$m$ and the alignment of the magnetic bit-cells 21$b$ may be directly determined. A method of calculating the above-described expected phase difference, pw1$_i$–pw0, is next described in terms of algebraic formulae.

With further reference to FIG. 4, in accordance with an embodiment of the present invention, conditions of data writing are as follows: data are not written into $N_p$-pieces of magnetic bit-cells 21$b$ from the start point $t_0$ to a recording start position $t_{ws}$ of the user data area 21$u$; data are written into N-pieces of magnetic bit-cells 21$b$ from the recording start position $t_{ws}$ to a recording end position $t_{we}$; and data are not written into $N_n$-pieces of magnetic bit-cells 21$b$ from the recording end position $t_{we}$ to an end point $t_{de}$ of the user data area 21$u$. The number, $N_p+N+N_n$, of magnetic bit-cells 21$b$ configuring the user data area 21$u$ has a given value. In addition, each of the length $\Delta t_{ss}$ of the range 21 us, the length $\Delta t_s$ of the servo data area 21$s$, and an interval $\Delta t_{rw}$ between the main pole 41$m$ of the write element 41 and the read element 43 have given values. Under these circumstances, the recording start position $t_{ws}$ may be represented as $t_o+N_p\times\Delta t_b$; the recording end position $t_{we}$ may be represented as $t_{ws}+N\times\Delta t_b$; and, the end point $t_{de}$ of the user data area 21$u$ may be represented as $t_{we}+N_n\times\Delta t_b$. In addition, the end point $t_1$ of the next servo data area 21$s$ may be represented as $t_0+\Delta t_{ss}$ or alternatively, as $t_{de}+\Delta t_s$.

With further reference to FIG. 4, in accordance with an embodiment of the present invention, when the read element 43 reaches the start point $t_0$ of the range 21 us, the phase-detecting unit 72 of the signal-processing unit 70 detects the phase, pw0, of the write-clock signal WCL taking into account the interval $\Delta t$ between the main pole 41$m$ of the write element 41 and the read element 43 (see FIG. 6A). At this time, the write-clock signal WCL at a position t is represented by eq. 1:

$$WCL = X\left(2\pi \times \frac{(t-t_0)}{(2\times\Delta t_b)} + pw0\right) \quad \text{(Eq. 1)}$$

In eq. 1, the following conditions are satisfied: X(t)=sgn(sin (t)) and sgn(x)=1(x>0) or 0(x=0) or –1(x<0).

Next, with further reference to FIG. 4, in accordance with an embodiment of the present invention, application of the magnetic-recording field begins when the main pole 41$m$ of the write element 41 reaches the recording start position $t_{ws}$ after the read element 43 passes through the start point $t_0$ of the range 21 us, which then moves by $\Delta t_{dw}+\Delta t_{wr}$. Then, when the main pole 41$m$ moves by $N\times\Delta t_b$ and reaches the recording end position $t_{we}$, application of the magnetic-recording field is terminated. Then, when the read element 43 moves by $N_n \times \Delta t_b - \Delta t_{rw}$, the read element 43 reaches the end point $t_{de}$ of the user data area 21*u*, which is the start point of the next servo data area 21*s*. Thereafter, the read element 43 reads the servo data while passing through the servo data area 21*s*. When the read element 43 reaches the end point $t_1$ of the range 21 us, the phase-detecting unit 72 detects the phase pw1 of the write-clock signal WCL taking into account the interval $\Delta t_{rw}$ between the main pole 41*m* of the write element 41 and the read element 43 (see FIG. 6B). The detection of the phase pw1 is performed before the write-clock signal WCL is synchronized. At this time, the write-clock signal WCL at the position t is represented by eq. 2:

$$WCL = X\left(2\pi \times \frac{(t-t_1)}{(2 \times \Delta t_b)} + pw1\right) \quad \text{(Eq. 2)}$$

With further reference to FIG. 4, in accordance with an embodiment of the present invention, the phase difference calculation unit 52 of the MPU 50 calculates the phase difference, pw1–pw0, which is the detected phase difference, between the phase, pw0, of the write-clock signal WCL at the start point $t_0$ and the phase, pw1, of the write-clock signal WCL at the end point $t_1$, and outputs the same to the determination-processing unit 46. Under these circumstances, in the case where the rotation speed of the spindle motor 3 and the frequency of the write-clock signal WCL do not vary, the eq. 1 becomes equal to the eq. 2, so that eq. 3 may be obtained using the phase, which is the expected value, $pw1_i$, of the write-clock signal WCL at the end point $t_1$ that is expected in this case:

$$WCL = X\left(2\pi \times \frac{(t-t_0)}{(2 \times \Delta t_b)} + pw0\right) = X\left(2\pi \times \frac{(t-t_1)}{(2 \times \Delta t_b)} + pw1_i\right) \quad \text{(Eq. 3)}$$

When t=t1 in eq. 3, the following eq. 4 may be obtained:

$$X\left(2\pi \times \frac{(t_1-t_0)}{(2 \times \Delta t_b)} + pw0\right) = X(pw1_i) \quad \text{(Eq. 4)}$$

Then, if eq. 4 is converted, the following eq. 5 may be obtained. Further, the eq. 5 may be converted to the following eqs. 6 and 7. The "mod 2 m" in each of these equations represents the "modulo operation 2π" that is defined as a remainder obtained after the expression in parentheses preceding the modulo operator is divided by 2π.

$$pw1_i = \left(2\pi \times \frac{(t_1-t_0)}{(2 \times \Delta t_b)} + pw0\right) \mod 2\pi \quad \text{(Eq. 5)}$$

$$pw1_i = \left(2\pi \times \frac{(t_1-t_0)}{(2 \times \Delta t_b)} + pw0\right) \mod 2\pi \quad \text{(Eq. 6)}$$
$$= \left(2\pi \times \frac{(\Delta t_b \times (N_p + N + N_n) + \Delta t_s)}{(2 \times \Delta t_b)} + pw0\right) \mod 2\pi$$

$$pw1_i - pw0 = \left(2\pi \times \frac{(t_1-t_0)}{(2 \times \Delta t_b)}\right) \mod 2\pi \quad \text{(Eq. 7)}$$
$$= \left(2\pi \times \frac{(\Delta t_b \times (N_p + N + N_n) + \Delta t_s)}{(2 \times \Delta t_b)}\right) \mod 2\pi$$

Under these circumstances, in the case where the rotation speed of the spindle motor 3 and the frequency of the write-clock signal WCL vary, the expected phase difference, $pw1_i$–pw0, shown in the eq. 7 differs from the detected phase difference, pw1–pw0, calculated by the phase difference calculation unit 52. Namely, the expected value, $pw1_i$, differs from the detected value pw1 of the phase of the write-clock signal WCL at the end point $t_1$. In the case where the difference between the expected value pw1 and the detected value, pw1, is within the predetermined acceptable range, the determination-processing unit 54 determines that the data writing is a success. On the other hand, in the case where the difference between the expected value, pw1 and the detected value, pw1, is out of the predetermined acceptable range, the determination-processing unit 54 determines that the data writing is a failure. Under these circumstances, the acceptable range may be, for example, about half the alignment pitch $\Delta t_b$ of the magnetic bit-cells 21*b*. In one embodiment of the present invention, the acceptable range is about half the width, which is, namely, the width of the groove 21*c*, $\Delta t_c$ of the nonmagnetic area formed between the adjacent magnetic bit-cells 21*b* shown in FIG. 2.

With further reference to FIG. 4, in accordance with an embodiment of the present invention, the positions of detecting the phase of the write-clock signal WCL are set at the start point $t_0$ and the end point $t_1$ of the range 21 us. However, this is by way of example and not limitation thereto, as the positions are not limited to the start point $t_0$ and the end point $t_1$ of the range 21 us, but may be any position as long as the position in the tracks 21 may be specified and the phase of the write-clock signal WCL may be detected. Under circumstances where the interval between the start position and the end position for detecting the phase of the write-clock signal WCL is made small, the accuracy of determination of success, or failure, of recording may be enhanced.

Figure 7:
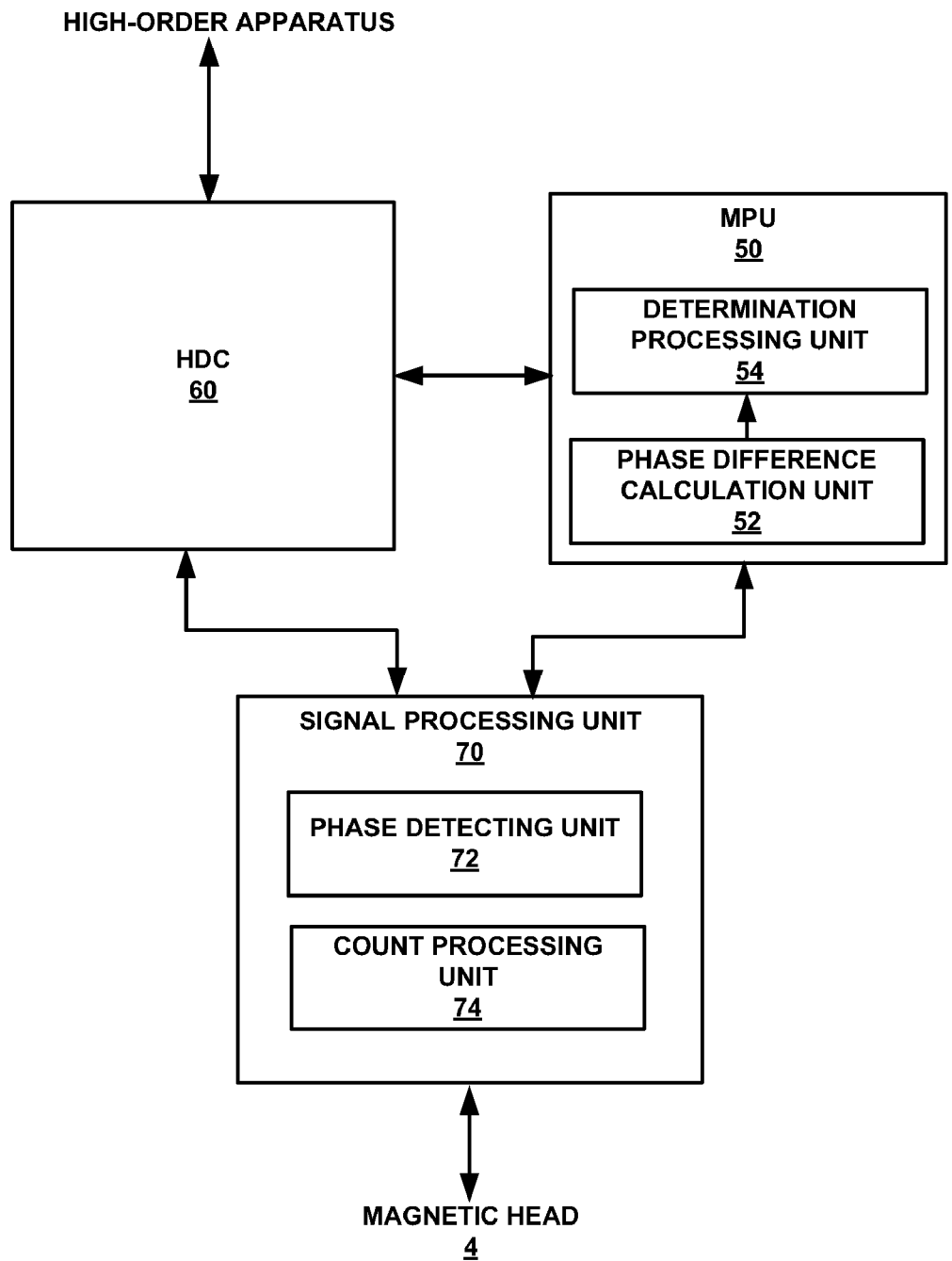
FIG. 7 is an example block diagram showing an example of a circuit configuration of the HDD, in accordance with an embodiment of the present invention.

With reference now to FIG. 7, in accordance with an embodiment of the present invention, a modified example block diagram is shown. FIG. 7 shows an example of a circuit configuration according to the modified example block diagram. In the following discussion, some circuit configurations appear with the same reference numerals as those appearing in FIG. 3. In the modified example block diagram, the signal-processing unit 70 includes a counter, also referred to herein as a count-processing unit 74, which counts the value of the write-clock signal WCL. The determination-processing unit 54 of the MPU 50 uses the value of the counted write-clock signal WCL to obtain a difference between the expected value, $pw1_i$, and the detected value, pw1, of the phase of the write-clock signal WCL when the magnetic-recording head 4 reaches the end point $t_1$ of the range 21 us. Specifically, when it is assumed that the values of the write-clock signals WCLs at the start point $t_0$ and the end point $t_1$ of the range 21 us are set as $n_0$ and $n_1$, respectively, the start point $t_0$ and the end point $t_1$ may be represented as $t_0 = 2 \times \Delta t_b \times (n_0 + pw0/2\pi)$ and $t_1 = 2 \times \Delta t_b \times (n_1 + pw1/2\pi)$, respectively, on the basis of 0 of the write-clock signal WCL (see FIGS. 6A and 6B). Furthermore, $n_1 - n_0$ is the value of the write-clock signal WCL counted during a period when the magnetic-recording head 4 passes from the start point $t_0$ to the end point $t_1$ of the range 21 us. Therefore, the above-described expected phase difference $pw1_i$–pw0 may be represented as the following eq. 8:

$$pw1_i - pw0 = 2\pi \times \frac{(t_1-t_0)}{(2 \times \Delta t_b)} - 2\pi \times (n_1 - n_0) \quad \text{(Eq. 8)}$$

-continued $$= 2\pi \times \frac{(\Delta t_b \times (N_p + N + N_n) + \Delta t_s)}{(2 \times \Delta t_b)} - 2\pi \times (n_1 - n_0)$$

With reference now to FIG. 7, in accordance with an embodiment of the present invention, as shown in the eq. 8, when the expected phase difference, $pw1_i-pw0$, is calculated in the modified example block diagram, the "mod" operation as shown in the eq. 7 is not applied. Accordingly, the computational load on the arithmetic processing is lightened, and the expected phase difference, $pw1_i-pw0$, may be obtained with higher accuracy. Further, even in the case where the expected phase difference, $pw1_i-pw0$, and the detected phase difference, $pw1-pw0$, are shifted from each other by one cycle, or more, this shift may be detected.

With further reference to FIG. 7, in accordance with an embodiment of the present invention, the combination of the phase-detecting unit 72 and the counter, the count-processing unit 74, included in the signal-processing unit 70 may be referred to as a time-detecting unit which detects a time interval during which the magnetic-recording head 4 passes from the start point $t_0$ to the end point $t_1$ of the range 21 us. Namely, a detected value of the time interval during which the magnetic-recording head 4 passes from the start point $t_0$ to the end point $t_1$ of the range 21 us may be obtained on the basis of the phase of the write-clock signal WCL detected by the phase-detecting unit 72 and the value of the write-clock signal WCL counted by the counter, the count-processing unit 74. On the other hand, an expected value of the time interval during which the magnetic-recording head 4 passes from the start point $t_0$ to the end point $t_1$ of the range 21 us may be obtained on the basis of a distance, $t_1-t_0(=\Delta t_b \times (N_p+N+N_n)+\Delta t_s)$, of the given range 21 us and the tracking speed of the magnetic-recording head 4 with respect to the tracks 21, which is the rotation speed of the magnetic-recording disk 2.

With further reference to FIG. 7, in accordance with an embodiment of the present invention, the drive-clock signal DCL as shown in FIG. 5 may be used instead of the write-clock signal WCL. Specifically, when it is assumed that the values of the drive-clock signals DCLs at the start point $t_0$ and the end point $t_1$ of the range 21 us are set as $m_0$ and $m_1$, respectively, the start point $t_0$ and the end point $t_1$ may be represented as $\Delta t_d \times (m_0+\Delta pm_0/2\pi)+pw0/2\pi$, and $\Delta t_d \times (m_1+\Delta pm_1/2\pi)+pw1/2\pi$, respectively, on the basis of 0 of the drive-clock signal DCL. Accordingly, the expected phase difference, $pw1_i-pw0$, may be obtained in similar manner as obtained above. Here, $\Delta t_d$ is the cycle of the drive-clock signal DCL. Further, $\Delta pm_0$ and $\Delta pm_1$ are phase differences between the drive-clock signal DCL and the write-clock signal WCL, and may be obtained from the drive-clock signal DCL. The write-clock signal WCL is produced on the basis of the drive-clock signal DCL. Accordingly, if the drive-clock signal DCL is used, the time interval may be detected with higher accuracy than the case where the write-clock signal WCL is used.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hard-disk drive comprising:
   a magnetic-recording disk including tracks on which a plurality of patterned bit-cells that are isolated magnetically from each other are aligned at predetermined alignment pitches;
   a magnetic-recording head which is configured to follow tracks and to write and to read data;
   a signal-processing unit which is configured to generate a recording signal based on a write-clock signal with cycles corresponding to said alignment pitches of said patterned bit-cells, and to output said recording signal to said magnetic-recording head;
   a phase-detecting unit which is configured to detect a phase of said write-clock signal when said magnetic-recording head reaches an end point of a predetermined range including a range into which data are written by said magnetic-recording head in said tracks, wherein the predetermined range is approximately half the alignment pitches of said patterned bit-cells; and
   a determination-processing unit which is configured to determine success of data writing based on a difference between an expected value and a detected value of said phase of said write-clock signal when said magnetic-recording head reaches said end point of said predetermined range, without requiring the performance of a verification process.

2. The hard-disk drive of claim 1, wherein said phase-detecting unit is configured to detect said phase of said write-clock signal when said magnetic-recording head reaches each of a start point and said end point of said predetermined range; and
   said determination-processing unit is configured to obtain said expected value based on said detected value of said phase of said write-clock signal when said magnetic-recording head reaches said start point of said predetermined range.

3. The hard-disk drive of claim 2, wherein said determination-processing unit is configured to obtain said expected value based on said a length of said predetermined range and said alignment pitches of said patterned bit-cells.

4. The hard-disk drive of claim 1, further comprising:
   a counter, wherein said counter is configured to count said value of said write-clock signal during a period when said magnetic-recording head passes through said predetermined range; and
   wherein said determination-processing unit is configured to determine success of data writing based on said value of said counted write-clock signal.

5. The hard-disk drive of claim 1, further comprising: a time-detecting unit, wherein said time-detecting unit is configured to detect a time interval during which said magnetic-recording head passes through said predetermined range; and
   wherein said determination-processing unit is configured to determine success of data writing based on said detected time interval.

6. The hard-disk drive of claim 1, wherein said determination-processing unit is configured to send an instruction to write said data again upon determining that said data writing has failed.

7. A hard-disk drive comprising:
- a magnetic-recording disk including tracks on which a plurality of patterned bit-cells that are isolated magnetically from each other are aligned at predetermined alignment pitches;
- a magnetic-recording head which is configured to follow said tracks and to write and to read data;
- a signal-processing unit which is configured to generate a recording signal based on a write-clock signal with cycles corresponding to said alignment pitches of said patterned bit-cells, and to output said recording signal to said magnetic-recording head;
- a time-detecting unit which is configured to detect a time interval during which said magnetic-recording head passes through a predetermined range including a range into which data are written by said magnetic-recording head in said tracks, wherein the predetermined range is approximately half the alignment pitches of said patterned bit-cells; and
- a determination-processing unit which is configured to determine success of data writing by said magnetic-recording head based on a difference between an expected value and a detected value of said time interval during which said magnetic-recording head passes through said predetermined range, without requiring the performance of a verification process.

8. The hard-disk drive of claim 7, wherein said determination-processing unit is configured to obtain said expected value based on a length of said predetermined range and a tracking speed of said magnetic-recording head with respect to said tracks.

9. A control method for magnetic recording on patterned media of a hard-disk drive, said method comprising:
- accessing a plurality of patterned bit-cells that are isolated magnetically from each other are aligned at predetermined alignment pitches;
- detecting a phase of a write-clock signal when a magnetic-recording head reaches an end point of a predetermined range including a range into which data is written by said magnetic-recording head in said tracks, wherein the predetermined range is approximately half the alignment pitches of the patterned bit-cells; and
- determining success of data writing by said magnetic-recording head based on a difference between an expected value and a detected value of said phase of said write-clock signal when said magnetic-recording head reaches said end point of said predetermined range without requiring the performing a verification process.

* * * * *